United States Patent
DeBord et al.

(10) Patent No.: US 11,543,384 B2
(45) Date of Patent: Jan. 3, 2023

(54) MOBILITY BASED FILTERING OF IONS

(71) Applicant: MOBILion Systems, Inc., Chadds Ford, PA (US)

(72) Inventors: John Daniel DeBord, West Grove, PA (US); Liulin Deng, Chester Springs, PA (US); Nathan Paul Roehr, Wilmington, DE (US)

(73) Assignee: MOBILion Systems, Inc., Chadds Ford, PA (US)

( * ) Notice: Subject to any disclaimer, the term of this patent is extended or adjusted under 35 U.S.C. 154(b) by 0 days.

(21) Appl. No.: 17/101,453

(22) Filed: Nov. 23, 2020

(65) Prior Publication Data
US 2021/0156822 A1   May 27, 2021

Related U.S. Application Data

(60) Provisional application No. 62/939,330, filed on Nov. 22, 2019.

(51) Int. Cl.
*G01N 27/622* (2021.01)

(52) U.S. Cl.
CPC ................... *G01N 27/622* (2013.01)

(58) Field of Classification Search
CPC .. H01J 49/00; H01J 49/02; H01J 49/06; H01J 49/062; H01J 49/065; G01N 27/622
USPC .................................................. 250/281, 282
See application file for complete search history.

(56) References Cited

U.S. PATENT DOCUMENTS

| | | | |
|---|---|---|---|
| 5,789,745 A | 8/1998 | Martin et al. |
| 6,107,628 A | 8/2000 | Smith et al. |
| 6,791,078 B2 | 9/2004 | Giles et al. |
| 6,794,641 B2 | 9/2004 | Bateman et al. |

(Continued)

FOREIGN PATENT DOCUMENTS

| | | |
|---|---|---|
| EP | 1942340 | 7/2008 |
| GB | 2457769 | 10/2008 |

(Continued)

OTHER PUBLICATIONS

"ESI/Ion Trap/Ion Mobility/Time-of-Flight Mass Spectrometry For Rapid and Sensitive Analysis of Biomolecular Mixtures," Henderson et al., Anal. Chem., vol. 71, Iss. 2, pp. 291-301, Jan. 15, 1999 (Abstract Only).

(Continued)

*Primary Examiner* — Jason L McCormack
(74) *Attorney, Agent, or Firm* — McCarter & English, LLP

(57) ABSTRACT

In one implementation, a mobility-based ion separation system includes a first ion channel extending between a first end and a second end, and configured to receive an ion packet. The separation system includes a controller configured to apply a first voltage signal and a second voltage signal to a first plurality of electrodes adjacent to the first ion channel. The first plurality of electrodes are configured to generate, based on receipt of the first voltage signal, a first traveling drive potential that travels at a first speed along a first direction, the first direction extending from the first end to the second end. The first plurality of electrodes are configured to generate, based on receipt of the second voltage signal, a second DC potential decreasing along a second direction, the second direction extending from the second end to the first end.

14 Claims, 8 Drawing Sheets

(56) References Cited

U.S. PATENT DOCUMENTS

| | | |
|---|---|---|
| 6,800,846 B2 | 10/2004 | Bateman et al. |
| 6,812,453 B2 | 11/2004 | Bateman et al. |
| 6,872,939 B2 | 3/2005 | Bateman et al. |
| 6,884,995 B2 | 4/2005 | Bateman et al. |
| 6,914,241 B2 | 7/2005 | Giles et al. |
| 7,064,321 B2 | 6/2006 | Franzen |
| 7,071,467 B2 | 7/2006 | Bateman et al. |
| 7,095,013 B2 | 8/2006 | Bateman et al. |
| 7,157,698 B2 | 1/2007 | Makarov et al. |
| 7,205,538 B2 | 4/2007 | Bateman et al. |
| 7,342,224 B2 | 3/2008 | Makarov et al. |
| 7,405,401 B2 | 7/2008 | Hoyes |
| 7,456,394 B2 | 11/2008 | Cameron et al. |
| 7,459,693 B2 | 12/2008 | Park et al. |
| 7,491,930 B2 | 2/2009 | Shvartsburg et al. |
| 7,507,953 B2 | 3/2009 | Makarov et al. |
| 7,514,676 B1 | 4/2009 | Page et al. |
| 7,671,344 B2 | 3/2010 | Tang et al. |
| 7,714,278 B2 | 5/2010 | Boyle et al. |
| 7,781,728 B2 | 8/2010 | Senko et al. |
| 7,829,841 B2 | 11/2010 | Bateman et al. |
| 7,838,826 B1 | 11/2010 | Park |
| 7,888,635 B2 | 2/2011 | Belov et al. |
| 7,960,694 B2 | 6/2011 | Hoyes |
| 8,288,717 B2 | 10/2012 | Park |
| 8,299,443 B1 | 10/2012 | Shvartsburg et al. |
| 8,319,177 B2 | 11/2012 | Boyle et al. |
| 8,378,297 B2 | 2/2013 | Vidal-De-Miguel |
| 8,384,024 B2 | 2/2013 | Miller et al. |
| 8,389,933 B2 | 3/2013 | Hoyes |
| 8,487,240 B2 | 7/2013 | Koehl |
| 8,581,177 B2 | 11/2013 | Kovtoun |
| 8,581,178 B2 | 11/2013 | Miller et al. |
| 8,742,339 B2 | 6/2014 | Hoyes |
| 8,809,769 B2 | 8/2014 | Park |
| 8,835,839 B1 | 9/2014 | Anderson et al. |
| 8,901,490 B1 | 12/2014 | Chen et al. |
| 8,907,273 B1 | 12/2014 | Chen et al. |
| 8,921,772 B2 | 12/2014 | Verenchikov |
| 8,941,054 B2 | 1/2015 | Park et al. |
| 8,941,055 B2 | 1/2015 | Park et al. |
| 8,946,626 B2 | 2/2015 | Giles et al. |
| 8,969,800 B1 | 3/2015 | Tolmachev et al. |
| 9,063,086 B1 | 6/2015 | Garimella et al. |
| 9,123,516 B2 | 9/2015 | Hasegawa et al. |
| 9,123,518 B2 | 9/2015 | Giles et al. |
| 9,281,170 B2 | 3/2016 | Park et al. |
| 9,417,211 B2 | 8/2016 | Verenchikov |
| 9,425,035 B2 | 8/2016 | Giles et al. |
| 9,429,543 B2 | 8/2016 | Jiang et al. |
| 9,455,132 B2 | 9/2016 | Mordehai et al. |
| 9,683,964 B2 | 6/2017 | Park et al. |
| 9,704,701 B2 | 7/2017 | Ibrahim et al. |
| 9,741,552 B2 | 8/2017 | Park et al. |
| 9,761,427 B2 | 9/2017 | Wouters et al. |
| 9,799,503 B2 | 10/2017 | Williams et al. |
| 9,812,311 B2 | 11/2017 | Anderson et al. |
| 9,824,874 B2 | 11/2017 | Ibrahim et al. |
| 9,865,442 B2 | 1/2018 | Giles et al. |
| 9,880,129 B2 | 1/2018 | Bateman |
| 9,887,074 B2 | 2/2018 | Belov |
| 9,916,968 B1 | 3/2018 | Kurulugama et al. |
| 9,939,408 B2 | 4/2018 | Giles et al. |
| 9,939,409 B2 | 4/2018 | Ibrahim et al. |
| 9,966,244 B2 | 5/2018 | Anderson et al. |
| 10,018,592 B2 | 7/2018 | Ibrahim et al. |
| 10,032,617 B2 | 7/2018 | Welkie |
| 10,060,879 B2 | 8/2018 | Silveira |
| 10,192,728 B2 | 1/2019 | Zhang et al. |
| 10,224,194 B2 | 3/2019 | Ibrahim et al. |
| 10,224,196 B2 | 3/2019 | Giles et al. |
| 10,241,079 B2 | 3/2019 | Betz et al. |
| 10,317,362 B2 | 6/2019 | Harder et al. |
| 10,317,364 B2 | 6/2019 | Garimella et al. |
| 10,319,575 B2 | 6/2019 | Brown et al. |
| 10,332,723 B1 | 6/2019 | Ibrahim et al. |
| 10,408,792 B2 | 9/2019 | Betz et al. |
| 10,424,474 B2 | 9/2019 | Ibrahim et al. |
| 10,460,920 B1 | 10/2019 | Smith et al. |
| 10,466,202 B2 | 11/2019 | Ibrahim et al. |
| 10,473,620 B2 | 11/2019 | Harder et al. |
| 10,497,552 B2 | 12/2019 | Ibrahim et al. |
| 10,515,790 B2 | 12/2019 | Cheng et al. |
| 10,522,337 B2 | 12/2019 | Rizzo et al. |
| 10,665,443 B2 | 5/2020 | Ibrahim et al. |
| 10,692,710 B2 | 6/2020 | Prabhakaran et al. |
| 10,720,315 B2 | 7/2020 | Taghioskoui |
| 10,741,375 B2 | 8/2020 | Hamid et al. |
| 10,804,089 B2 | 10/2020 | Ibrahim et al. |
| 10,811,244 B2 | 10/2020 | Green et al. |
| 10,840,077 B2 | 11/2020 | Taghioskoui |
| 10,861,687 B2 | 12/2020 | Wildgoose et al. |
| 10,976,283 B2 | 4/2021 | Ibrahim et al. |
| 11,209,393 B2 | 12/2021 | Garimella et al. |
| 11,322,340 B2 | 5/2022 | Hamid et al. |
| 2004/0245452 A1* | 12/2004 | Bateman ............ G01N 27/622 |
| | | 250/287 |
| 2008/0308721 A1 | 12/2008 | Senko et al. |
| 2016/0071715 A1 | 3/2016 | Anderson et al. |
| 2018/0151339 A1 | 5/2018 | Wildgoose et al. |
| 2018/0236426 A1 | 8/2018 | Finlay |
| 2019/0004011 A1 | 1/2019 | Garimella et al. |
| 2019/0103261 A1* | 4/2019 | Ibrahim ............... H01J 49/068 |
| 2019/0348268 A1 | 11/2019 | Hamid et al. |
| 2019/0369049 A1 | 12/2019 | Ridgeway |
| 2019/0369050 A1* | 12/2019 | Garimella ............ H01J 49/062 |
| 2020/0161119 A1 | 5/2020 | Richardson et al. |
| 2020/0200708 A1 | 6/2020 | Ibrahim et al. |
| 2020/0227247 A1 | 7/2020 | Boumsellek et al. |
| 2020/0278319 A1 | 9/2020 | Melhirst et al. |
| 2020/0321190 A1 | 10/2020 | Ibrahim et al. |
| 2020/0321208 A1 | 10/2020 | Cooks et al. |
| 2020/0326304 A1 | 10/2020 | Giles et al. |
| 2020/0373139 A1 | 11/2020 | DeBord et al. |
| 2020/0378922 A1 | 12/2020 | Ibrahim et al. |
| 2020/0381241 A1 | 12/2020 | Park et al. |
| 2020/0395202 A1 | 12/2020 | Richardson et al. |
| 2021/0080429 A1 | 3/2021 | Debord et al. |
| 2021/0310989 A1 | 10/2021 | DeBord et al. |
| 2021/0364467 A1 | 11/2021 | DeBord et al. |
| 2021/0382006 A1 | 12/2021 | DeBord et al. |
| 2022/0074891 A1 | 3/2022 | DeBord et al. |
| 2022/0136999 A1 | 5/2022 | Garimella et al. |

FOREIGN PATENT DOCUMENTS

| | | |
|---|---|---|
| WO | WO 2020/201732 | 10/2020 |
| WO | WO 2020/243194 | 12/2020 |
| WO | 2021/102406 A1 | 5/2021 |

OTHER PUBLICATIONS

"Separation of Isomeric Peptides Using Electrospray Ionization/High-Resolution Ion Mobility Spectrometry," Wu et al., Anal. Chem., vol. 72, Iss. 2, pp. 391-395, Jan. 15, 2000 (Abstract Only).

"Ion Trap/Ion Mobility/Quadrupole/Time-of-Flight Mass Spectrometry for Peptide Mixture Analysis," Hoaglund-Hyzer et al., Anal. Chem., vol. 73, Iss. 2, pp. 177-184, Jan. 15, 2001 (Abstract Only).

Agbonknkon, Nosa, "Counter-flow Ion Mobility Analysis: Design, Instrumentation, and Characterization," Theses and Dissertations. 1215., https://scholarsarchive.byu.edu/etd/1215, Nov. 14, 2007.

"Ion Mobility—Mass Spectrometry," Jiang et al., Encyclopedia of Anal. Chem., DOI:10.1002/9780470027318.a9292, 2013.

"Development of a new ion mobility time-offlight mass spectrometer," Ibrahim et al., Int'l Journal of Mass Specrometry, 377 (2015) 655-662, Jul. 28, 2014.

"A New Ion Mobility-Linear Ion Trap Instrument for Complex Mixture Analysis," Donohoe, et al., Anal. Chem., vol. 86, Iss. 16, pp. 8121-8128, Aug. 19, 2014.

"Ion Trapping, Storage, and Ejection in Structures for Lossless Ion Manipulations," Zhang et al., Anal. Chem. 2015, 87, 6010-6016, May 14, 2015.

(56) References Cited

OTHER PUBLICATIONS

"Ion Mobility Spectrometry with High Ion Utilization Efficiency Using Travelign Wave-Based Structures for Lossless Ion Manipulations (SLIM)," Li, et al., poster presented at the Proceedings of the 68th ASMS Conference on Mass Spectrometry and Allied Topics, Online Meeting, Jun. 1-12, 2020.

"Ion Mobility Spectrometry with High Ion Utilization Efficiency Using Traveling Wave-Based Structures for Lossless Ion Manipulations," Li et al., Anal. Chem., vol. 92, Iss. 22, pp. 14930-14938, Oct. 26, 2020.

U.S. Appl. No. 62/939,330, filed Nov. 22, 2019, N/A.

Prabhakaran et al., "A Hybrid Constant and Oscillatory Field Ion Mobility Analyzer Using Structures for Lossless Ion Manipulations," J. Am. Soc. Mass Spectrom. (2018) 29:342-351, Dec. 12, 2017 (10 pages).

PCT International Search Report and Written Opinion dated Feb. 12, 2021, for Int'l App. No. PCT/US2020/061778 (17 pages).

\* cited by examiner

MOBILITY BASED FILTERING OF IONS

CROSS-REFERENCE TO RELATED APPLICATIONS

The present application claims the benefit of priority to U.S. Provisional Patent Application No. 62/939,330 filed on Nov. 22, 2019 and entitled Mobility Based Filtering of Ions, which is herein incorporated by reference in its entirety.

FIELD OF THE INVENTION

The present disclosure is directed to systems and corresponding methods for mobility based filing of ions, and more particularly to systems and methods for selecting ions within one or more predetermined ranges of mobility and directing the selected band (or bands) of ions to a detector (or detectors), and still further to systems and methods which utilize two or more waveforms for filtering a plurality of ions based on mobility.

BACKGROUND OF THE INVENTION

Ion mobility spectrometry (IMS) is a technique for separating and identifying ions in gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

Mass spectrometry (MS) is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection. Ions with different mass-to-charge ratios can undergo different deflections, and can be identified based on the spatial location of detection by a detector (e.g., electron multiplier).

SUMMARY OF THE DISCLOSURE

In general, embodiments of the disclosure provide systems and corresponding methods for mobility based filtering of ions.

A mobility-based ion separation/filtering system can include a first ion channel extending between a first end and a second end, and configured to receive an ion packet. The separation system includes a controller configured to apply a first voltage signal and a second voltage signal to a first plurality of electrodes adjacent to the first ion channel. The first plurality of electrodes are configured to generate, based on receipt of the first voltage signal, a first traveling drive potential that travels at a first speed along a first direction. The first direction extends from the first end to the second end. The first plurality of electrodes are configured to generate, based on receipt of the second voltage signal, a second DC potential decreasing along a second direction, and the second direction extends from the second end to the first end. A first ion sub-packet of the ion packet having ions with mobilities above a first threshold mobility value is directed along one of the first and the second direction, and a second ion sub-packet of the ion packet having ions with mobilities below the first threshold mobility value is directed along the other of the first and the second direction.

In one implementation, the first ion channel is defined between a first surface and a second surface adjacent to the first surface. The second surface includes a second plurality of electrodes comprising a first electrode and a second electrode spaced apart from the first electrode along a third direction lateral to the first direction. The first plurality of electrodes are located between the first electrode and the second electrode and arranged along the first direction. In another implementation, the controller includes one or more traveling wave control circuits electrically coupled to the first plurality of electrodes. The one or more traveling wave control circuits are configured to generate a first plurality of traveling wave voltage signals. The first voltage signal includes the first plurality of traveling wave voltage signals. One or more DC control circuits are electrically coupled to the first plurality of electrodes. The one or more DC control circuits are configured to generate a second plurality of DC voltage signals and the second voltage signal includes the second plurality of DC voltage signals.

In one implementation, the controller includes a master control circuit communicatively coupled to the one or more traveling wave control circuits and the one or more DC control circuits. The master control circuit is configured to determine one or more of amplitudes and/or frequencies of the first plurality of traveling wave voltage signals and the second plurality of DC voltage signals. The master control circuit is also configured to provide traveling wave control signals and DC control signals to the one or more traveling wave control circuits and the one or more DC control circuits. The traveling wave control signal and the DC control signals are indicative of one or more of the amplitudes and/or frequencies of the first plurality of traveling wave voltage signals and second plurality of DC voltage signals, respectively. In another implementation, the master control circuit is further configured to determine the first speed of the first traveling drive potential, and a gradient of the second DC potential.

In one implementation, the system further includes second ion channel extending between a third end and a fourth end, and configured to receive the first ion sub-packet. The controller is configured to apply a third voltage signal and a fourth voltage signal to a third plurality of electrodes adjacent to the second ion channel. The third plurality of electrodes are configured to generate, based on receipt of the third voltage signal, a third traveling drive potential that travels at a third speed along a third direction, and the third direction extends from the third end to the fourth end. The third plurality of electrodes are configured to generate, based on receipt of the fourth voltage signal, a fourth traveling drive potential that travels at a fourth speed along a fourth direction, and the fourth direction extends from the fourth end to the third end. A third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

In one implementation, the system further includes a second ion channel extending between a third end and a fourth end, and configured to receive the first ion sub-packet. The controller is configured to apply a third voltage signal and a fourth voltage signal to a third plurality of electrodes adjacent to the second ion channel. The third plurality of electrodes are configured to generate, based on receipt of the third voltage signal, a third traveling drive potential that travels at a third speed along a third direction. The third direction extends from the third end to the fourth end. The third plurality of electrodes are configured to generate, based on receipt of the fourth voltage signal, a fourth DC potential decreasing along a fourth direction. The fourth direction extends from the fourth end to the third end. A third ion sub-packet of the first ion sub-packet having ions with mobilities above a second threshold mobility value is directed along one of the third and the fourth direction, and a fourth ion sub-packet of the first ion sub-packet having ions with mobilities below the second threshold mobility value is directed along the other of the third and the fourth direction.

In one implementation, the system includes a first ion channel extending between a first end and a second end, and configured to receive an ion packet. The system also includes a controller configured to apply a first voltage signal and a second voltage signal to a first plurality of electrodes adjacent to the first ion channel. The first plurality of electrodes are configured to generate, based on receipt of the first voltage signal, a first traveling drive potential that travels at a first speed along a first direction, and the first direction extends from the first end to the second end. The first plurality of electrodes are configured to generate, based on receipt of the second voltage signal, a second traveling drive potential that travels at a second speed along a second direction, the second direction extending from the second end to the first end. A first ion sub-packet of the ion packet having ions with mobilities above a first threshold mobility value is directed along the first direction, and a second ion sub-packet of the ion packet having ions with mobilities below the first threshold mobility value is directed along the second direction.

In one implementation, the first ion channel is defined between a first surface and a second surface adjacent to the first surface. The second surface includes a second plurality of electrodes comprising a first electrode and a second electrode spaced apart from the first electrode along a third direction lateral to the first direction. The first plurality of electrodes are located between the first electrode and the second electrode and arranged along the first direction.

In one implementation, the controller includes a first plurality of traveling wave control circuits electrically coupled to the first plurality of electrodes. The first plurality of traveling wave control circuits configured to generate a first plurality of traveling wave voltage signals. The first voltage signal includes the first plurality of traveling wave voltage signals. A second plurality of traveling wave control circuits are electrically coupled to the first plurality of electrodes. The second plurality of traveling wave control circuits are configured to generate a second plurality of traveling wave voltage signals. The second voltage signal includes the second plurality of traveling wave voltage signals.

In one implementation, the controller includes a master control circuit communicatively coupled to the first and the second plurality of traveling wave control circuits. The master control circuit is configured to determine one or more of amplitudes and/or frequencies of the first and the second plurality of traveling wave voltage signals; and provide one or more traveling wave control signals to the first and the second plurality of traveling wave control circuits. The one or more traveling wave control signals are indicative of one or more of the amplitudes and/or frequencies of the first and the second plurality of traveling wave voltage signals. In another implementation, the master control circuit is further configured to determine the first speed of the first traveling drive potential, and the second speed of the second traveling drive potential.

In one implementation, the system further includes a second ion channel extending between a third end and a fourth end, and configured to receive the first ion sub-packet. The controller is configured to apply a third voltage signal and a fourth voltage signal to a third plurality of electrodes adjacent to the second ion channel. The third plurality of electrodes are configured to generate, based on receipt of the third voltage signal, a third traveling drive potential that travels at a third speed along a third direction, and the third direction extends from the third end to the fourth end. The third plurality of electrodes are configured to generate, based on receipt of the fourth voltage signal, a fourth traveling drive potential that travels at a fourth speed along a fourth direction, and the fourth direction extends from the fourth end to the third end. A third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

In one implementation, a method of mobility-based ion separation includes providing a first ion channel extending between a first end and a second end, and configured to receive an ion packet. The method also includes applying a first voltage signal and a second voltage signal to a first plurality of electrodes adjacent to the first ion channel. The method further includes generating, by the first plurality of electrodes, a first traveling drive potential that travels at a first speed along a first direction. The first direction extends from the first end to the second end, and the generating of the first traveling drive potential based on receipt of the first voltage signal. The method further includes generating, by the first plurality of electrodes, a second DC potential decreasing along a second direction, and the second direction extends from the second end to the first end. The generating of the second DC potential is based on receipt of the second voltage signal. A first ion sub-packet of the ion packet having ions with mobilities above a first threshold mobility value is directed along one of the first and the second direction, and a second ion sub-packet of the ion packet having ions with mobilities below the first threshold mobility value is directed along the other of the first and the second direction.

In one implementation, the first ion channel is defined between a first surface and a second surface adjacent to the first surface. The second surface includes a second plurality of electrodes comprising a first electrode and a second electrode spaced apart from the first electrode along a third direction lateral to the first direction. The first plurality of electrodes are located between the first electrode and the second electrode and arranged along the first direction.

In one implementation, the method further includes generating, by one or more traveling wave control circuits electrically coupled to the first plurality of electrodes, a first plurality of traveling wave voltage signals. The first voltage signal includes the first plurality of traveling wave voltage signals. The method further includes generating, by one or more DC control circuits electrically coupled to the first plurality of electrodes, a second plurality of DC voltage signals. The second voltage signal includes the second plurality of DC voltage signals.

In another implementation, the method further includes determining, by a master control circuit communicatively coupled to the one or more traveling wave control circuits and the one or more DC control circuits, one or more of amplitudes and/or frequencies of the first plurality of traveling wave voltage signals and the second plurality of DC voltage signals. The method also includes providing, by the master control circuit, traveling wave control signals and DC control signals to the one or more traveling wave control circuits and the one or more DC control circuits. The traveling wave control signal and the DC control signals are indicative of one or more of the amplitudes and/or frequencies of the first plurality of traveling wave voltage signals and second plurality of DC voltage signals, respectively. In yet another implementation, the master control circuit is further configured to determine the first speed of the first traveling drive potential, and a gradient of the second DC potential.

In one implementation, the method further includes providing, a second ion channel extending between a third end and a fourth end, and configured to receive the first ion sub-packet; applying, a third voltage signal and a fourth voltage signal to a third plurality of electrodes adjacent to the second ion channel; and generating, by the third plurality of electrodes, a third traveling drive potential that travels at a third speed along a third direction. The third direction extends from the third end to the fourth end. The generating of the third traveling drive potential is based on receipt of the third voltage signal. The method further includes generating, by the third plurality of electrodes, a fourth traveling drive potential that travels at a fourth speed along a fourth direction. The fourth direction extends from the fourth end to the third end and the generating of the fourth traveling drive potential is based on receipt of the fourth voltage signal. A third ion sub-packet of the first ion sub-packet having ions with mobilities above a second threshold mobility value is directed along the third direction. A fourth ion sub-packet of the first ion sub-packet having ions with mobilities below the second threshold mobility value is directed along the fourth direction.

In another implementation, the method further includes providing, a second ion channel extending between a third end and a fourth end, and configured to receive the first ion sub-packet; applying, a third voltage signal and a fourth voltage signal to a third plurality of electrodes adjacent to the second ion channel, and generating, by the third plurality of electrodes, a third traveling drive potential that travels at a third speed along a third direction. The third direction extends from the third end to the fourth end. The generating of the third traveling drive potential is based on receipt of the third voltage signal. The method also includes generating, by the third plurality of electrodes, a fourth DC potential decreasing along a fourth direction. The fourth direction extends from the fourth end to the third end, and the generating of the fourth DC potential is based on receipt of the fourth voltage signal. A third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

In one implementation, the method includes providing a first ion channel extending between a first end and a second end, and configured to receive an ion packet; applying a first voltage signal and a second voltage signal to a first plurality of electrodes adjacent to the first ion channel; and generating, by the first plurality of electrodes, a first traveling drive potential that travels at a first speed along a first direction. The first direction extends from the first end to the second end. The generating of the first traveling drive potential is based on receipt of the first voltage signal. The method also includes generating, by the first plurality of electrodes, a second traveling drive potential that travels at a second speed along a second direction. The second direction extends from the second end to the first. A first ion sub-packet of the ion packet having ions with mobilities above a first threshold mobility value is directed along one of the first and the second direction, and a second ion sub-packet of the ion packet having ions with mobilities below the first threshold mobility value is directed along the other of the first and the second direction.

In one implementation, the first ion channel is defined between a first surface and a second surface adjacent to the first surface. The second surface includes a second plurality of electrodes comprising a first electrode and a second electrode spaced apart from the first electrode along a third direction lateral to the first direction. The first plurality of electrodes are located between the first electrode and the second electrode and arranged along the first direction. In another implementation, the method further includes generating, by a first plurality of traveling wave control circuits electrically coupled to the first plurality of electrodes, a first plurality of traveling wave voltage signals. The first voltage signal includes the first plurality of traveling wave voltage signals. The method further includes generating, by a second plurality of DC control circuits electrically coupled to the first plurality of electrodes, a second plurality of DC voltage signals. The second voltage signal includes the second plurality of DC voltage signals.

BRIEF DESCRIPTION OF THE FIGURES

These and other features will be more readily understood from the following detailed description taken in conjunction with the accompanying drawings, in which.

DETAILED DESCRIPTION OF THE PREFERRED EMBODIMENTS

Certain exemplary embodiments will now be described to provide an overall understanding of the principles of the structure, function, manufacture, and use of the systems, devices, and methods disclosed herein.

Ions can be separated based on their mobility via ion mobility spectroscopy (IMS). Mobility separation can be achieved, for example, by applying one or more potential waveforms (e.g., traveling potential waveforms, direct current (DC) potential, or both) on a collection of ions. IMS based mobility separation can be achieved by structures of lossless ion manipulation (SLIM) that can systematically apply traveling and/or DC potential waveforms to a collection of ions. This can result in a continuous stream of ions that are temporally/spatially separated based on their mobility. In some implementations, it can be desirable to select ions having a predetermined mobility range from a collection of ions. This can be achieved by mobility based filtering of ions in SLIM devices ("SLIM filters"). SLIM filters (e.g., low pass filters, high pass filters, band pass filters, etc.) can apply a superposition to multiple potential waveforms that are directed (e.g., traveling) in different directions. Properties of the potential waveforms (e.g., amplitude, shape, frequency, etc.) can determine the properties of the SLIM filter (e.g., bandwidth, cut-off mobility values, etc.).

Figure 1:
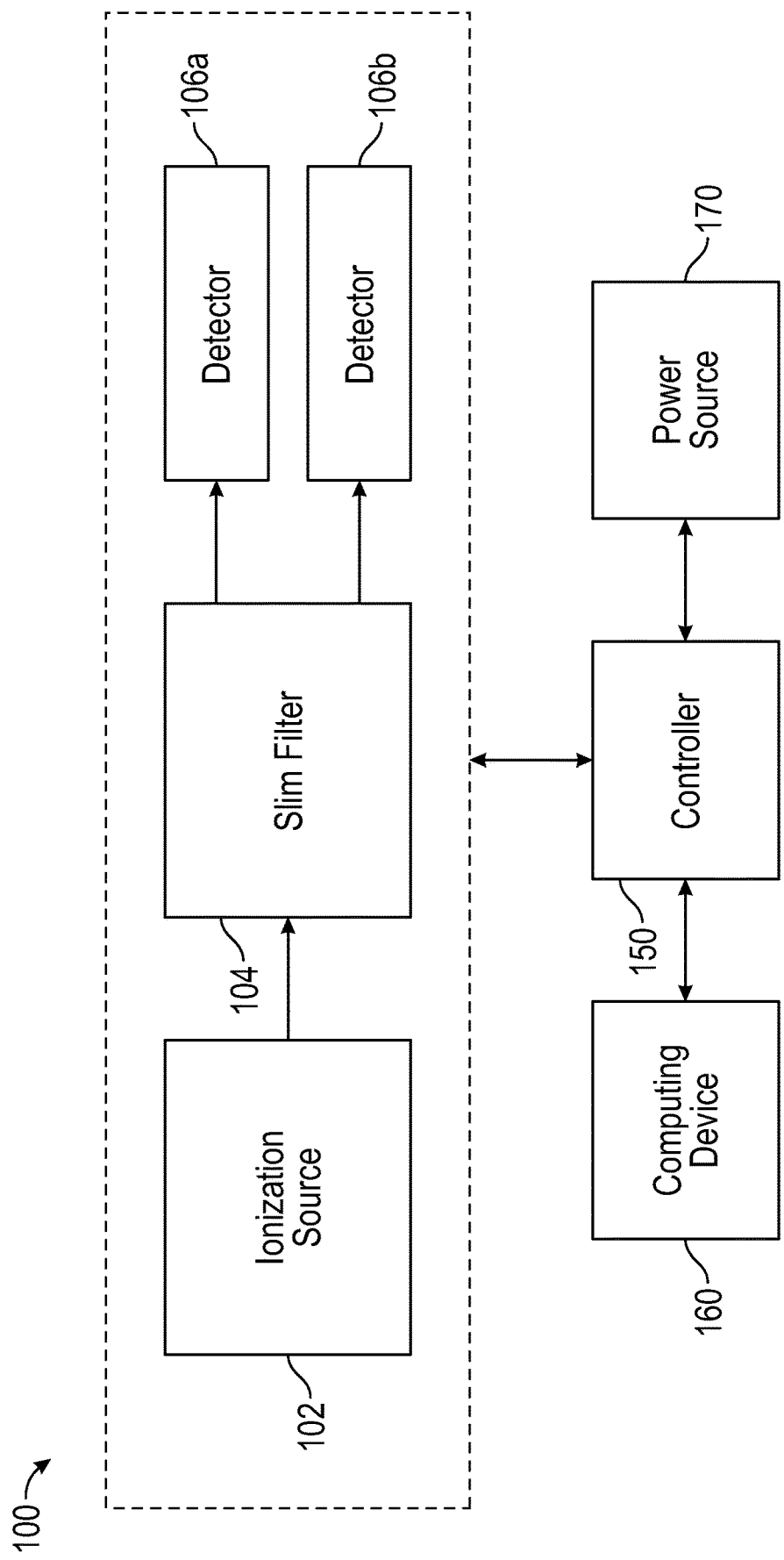
FIG. 1 is a schematic illustration of an exemplary mobility filter system.

FIG. 1 is a schematic illustration of an exemplary mobility filter system 100. The mobility filter system 100 includes an ionization source 102 that can generate ions (e.g., ions having varying mobility and mass-to-charge-ratios) and inject the ions into a SLIM filter 104. The SLIM filter 104 can select ions with one or more predetermined ranges of mobility and direct the select band (or bands) of ions to a detector (or detectors). For example, if two bands of ion mobility are selected, the first band can be directed to detector 106a and the second band can be directed to detector 106b.

The SLIM filter 104 can generate potential waveforms (e.g., by application of an RF and/or AC and/or DC voltage on electrodes in the SLIM filter 104). For examples, pairs of potential waveforms configured to drive ions in opposite directions (e.g., traveling in opposite directions) can be generated by a first separation region of the SLIM filter. The properties of the pair of waveforms can determine a first threshold mobility around which the ions ("ion packet") are separated. Ions with mobility higher than the first threshold mobility (first ion sub-packet) are directed in a first direction and ions with mobility smaller than the first threshold mobility (second ion sub-packet) are directed in a second direction. A second separation region of the SLIM filter 104 can receive the first ion sub-packet. The second separation region can generate a second pair of potential waveforms directed in opposite directions (e.g., traveling in opposite directions). Ions in the first ion sub-packet with mobility higher than a second threshold mobility (third ion sub-packet) are directed in a third direction and ions with mobility smaller than the second threshold mobility (fourth ion sub-packet) are directed in a fourth direction.

In the operation described above, the SLIM filter 104 can operate as a mobility band pass filter. For example, the fourth ion sub-packet comprises ions having an ion mobility greater than the first threshold mobility and lower than the second threshold mobility. The second/third/fourth ion sub-packet can be directed to the detectors 106a and 106b for further detection and analysis.

A controller 150 can control the operation of an ionization source 102, SLIM filter 104 and detectors 106a and 106b. For example, the controller 150 can control the rate of injection of ions into the input SLIM filter 104 by the ionization source 102, threshold mobility of SLIM filter 104, and ion detection be the detectors 106a and 106b. The controller 150 can also control the characteristics and motion of potential waveforms in the SLIM filter 104 (e.g., by applying RF/AC/DC potentials to electrodes in the SLIM filter 104).

Controller 150 can control the generation of potential waveforms by applying RF/AC/DC potentials to electrodes in the SLIM filter 104. The controller 150 can control the properties of the potential waveforms (e.g., amplitude, shape, frequency, etc.) by varying the properties of the applied RF/AC/DC potential (or current). In some implementations, the controller 150 can vary the properties (e.g., iteratively) of the pair of potential waveformS in the separation regions of the SLIM filter to improve the separation of ions (e.g., achieve sharp separation around a threshold mobility). Once the desirable properties are determined, the corresponding values can be stored in a database for future reference. Controller 150 can also synchronize the arrival time of the ion packet in the SLIM filter 104 (e.g., arrival at the first/second separation region of the SLIM filter 104) with the generation of pairs of traveling/DC potential waveforms directed in opposite directions.

The controller 150 can include multiple power supply modules (e.g., current/voltage supply circuits) that generate various voltage (or current) signals that drive the electrodes in the SLIM filter 104. For example, the controller 150 can include RF control circuits that generate RF voltage signals, traveling wave control circuits that generate traveling wave voltage signals, DC control circuits that generate DC voltage signals, etc. The RF voltage signals, traveling wave voltage signals, DC voltage signal can be applied to electrodes in the input SLIM filter 104. The controller 150 can include DC control circuits that can generate DC voltage signals which in turn can generate a DC potential waveform in the SLIM filter 104. The DC control circuits can vary the amplitudes of the various DC voltage signals which can determine the gradient (or slope) of the DC potential waveform.

In some implementations, the controller 150 can generate traveling potential waveforms that are traveling in opposite directions in the separation regions of the SLIM filter 104. In some implementations, the controller 150 can generate a traveling potential waveform that is traveling in one direction and a DC potential waveform with a gradient that can drive the ions in the opposite direction. The controller 150 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the mobility filter system 100.

As discussed above, the SLIM filter 104 can generate DC/traveling potential waveform (e.g., resulting from potentials generated by multiple electrodes in the SLIM filter 104). The traveling potential waveform can travel at a predetermined velocity based on, for example, frequency of voltage signals applied to the electrodes. In some implementations, the speed/amplitude/shape of the traveling potential waveform and/or gradient of the DC potential waveform can determine the properties of the SLIM filter 104. For example, the type of filter (e.g., low pass, band pass, high pass, etc.), and the cut-off mobility values of the filter can be determined by the properties of the traveling/DC potential waveforms.

In some implementations, the traveling potential waveform can be spatially periodic and the spatial periodicity can depend on the phase differences between the voltage signals applied to adjacent electrode pairs. In some implementations, the phase differences can determine the direction of propagation of the potential waveform. The master control circuit can control the frequency and/or phase of voltage outputs of RF/traveling wave control circuits such that the traveling potential waveform has a desirable (e.g., predetermined) spatial periodicity and/or speed.

In some implementations, the controller 150 can be communicatively coupled to a computing device 160. For example, the computing device 160 can provide operating parameters of the mobility filter system 100 via a control signal to the master control circuit. In some implementations, a user can provide the computing device 160 (e.g., via a user interface) with the operating parameters. Based on the operating parameters received via the control signal, the master control circuit can control the operation of the RF/AC/DC control circuits which in turn can determine the operation of the coupled SLIM-MS 100. In some implementations, RF/AC/DC control circuits can be physically distributed over the mobility filter system 100. For example, one or more of the RF/AC/DC control circuits can be located in the mobility filter system 100. The controller 150 can receive power from a power source 170 (e.g., DC power source that provides a DC voltage to the controller 150). The various RF/AC/DC control circuits can operate based on the power from the power source 170.

Figure 2:
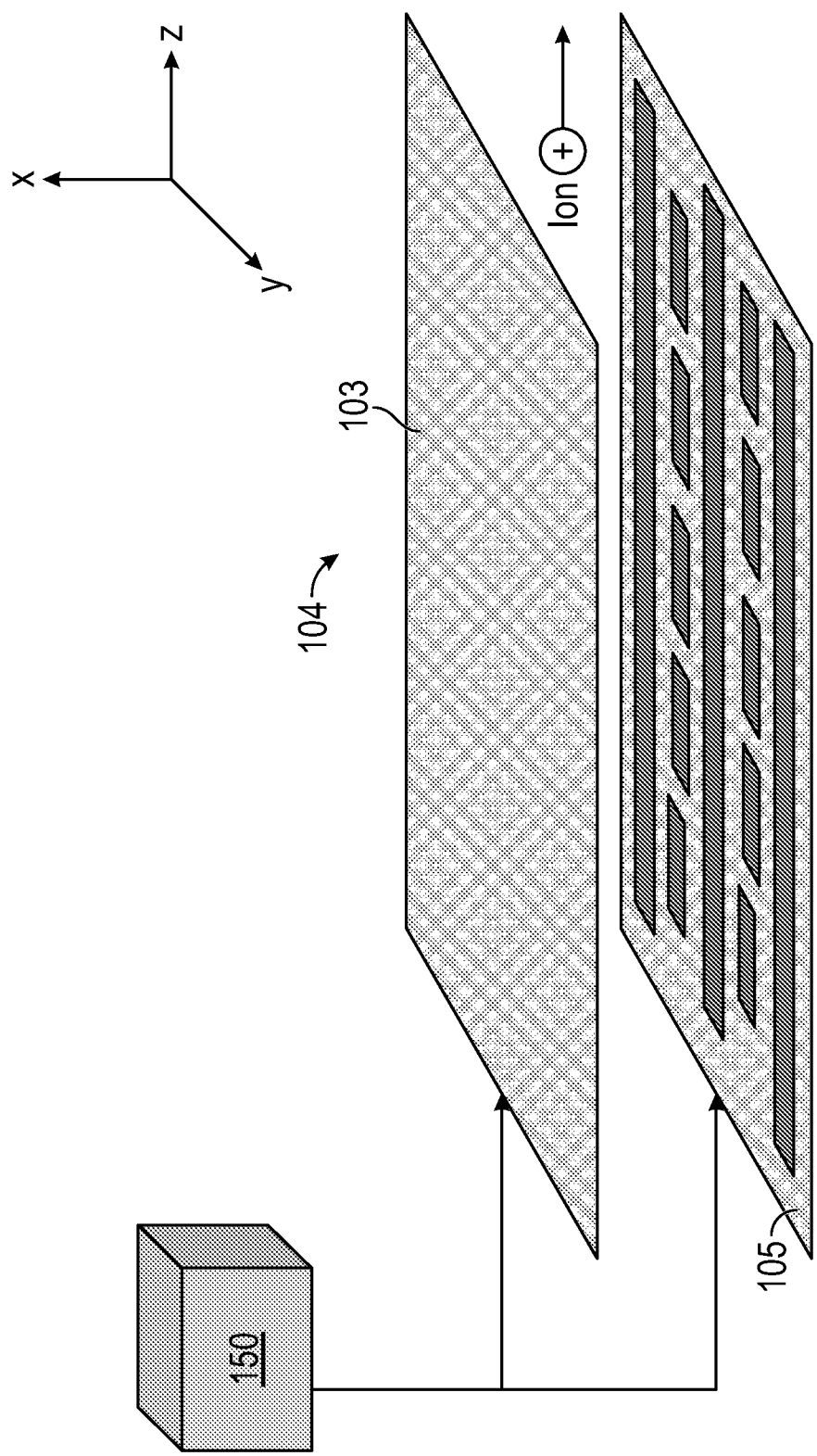
FIG. 2 illustrates an exemplary embodiment of a portion of a SLIM filter in the mobility filter system of FIG. 1.

FIG. 2 illustrates an exemplary embodiment of a portion of the SLIM filter 104 (e.g., first/second separation region, SLIM for transferring ions between/to/from separation regions, etc.). The SLIM filter 104 can include a first surface 103 and a second surface 105. The first and second surfaces can be arranged (e.g., parallel to one another) to define one or more ion channels between them. The first surface 103 and second surface 105 can include electrodes (e.g., arranged as arrays of electrodes on the surfaces facing the ion channel). The electrodes on the first surface 103 and second surface 105 can be configured to electrically couple to the controller 150 and receive voltage (or current) signals or waveforms. In some implementations, the first surface 103 and second surface 105 can include a backplane that includes multiple conductive channels that allow for electrical connection between the controller 108 and the electrodes on the first surface 103 and second surface 105. In some implementations, the number of conductive channels can be fewer than the number of electrodes. In other words, multiple electrodes can be connected to a single electrical channel. As a result, a given voltage (or current) signal can be transmitted to multiple electrodes simultaneously. Based on the received voltage (or current) signals, the electrodes can generate one or more potentials (e.g., a superposition of various potentials) that can confine, drive and/or separate ions along a propagation axis (e.g., z-axis).

Figure 3:
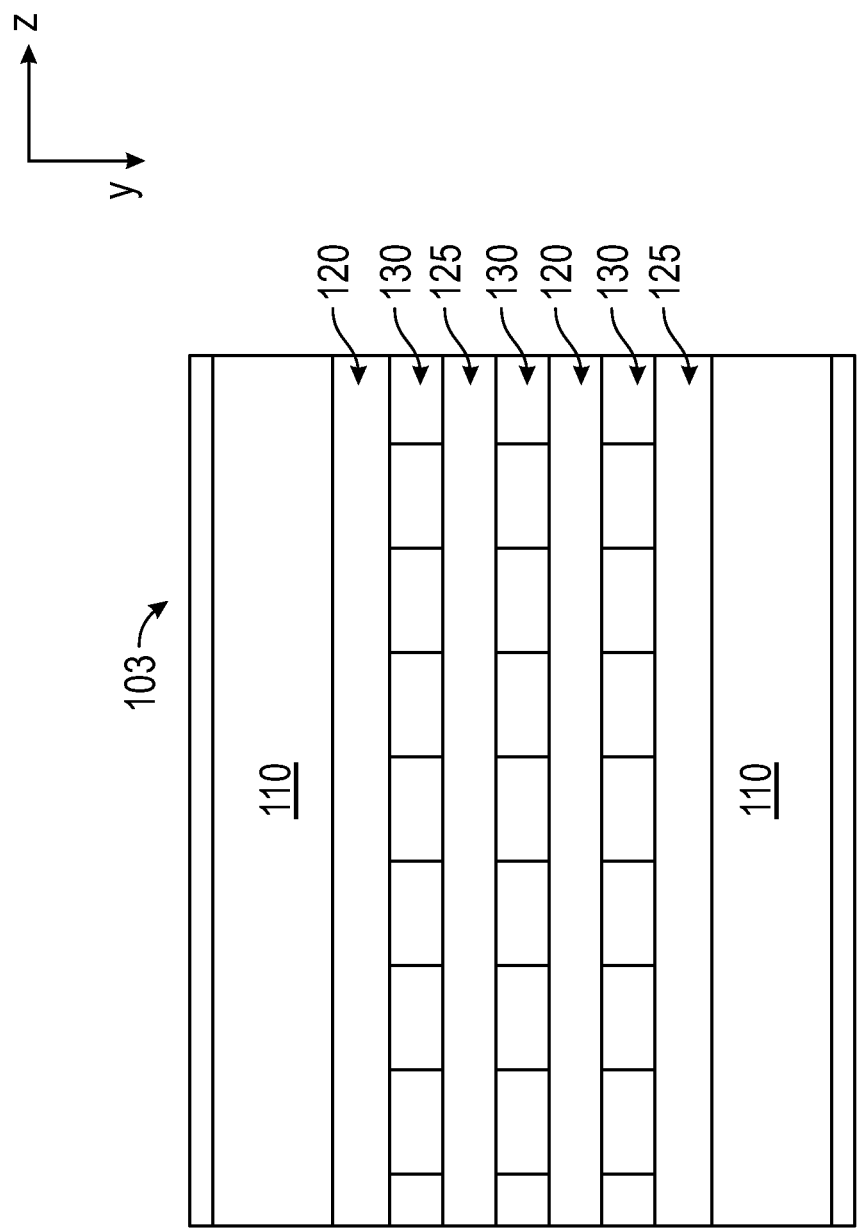
FIG. 3 illustrates an exemplary arrangement of electrodes on the surfaces of the SLIM filter in FIG. 2.

The first and the second surfaces 103 and 105 can include a plurality of electrodes. FIG. 3 illustrates an exemplary arrangement of electrodes on the first surface 103. Although the electrode arrangement on the first surface 103 is described below, second surface 105 can include electrodes with similar electrode arrangement. The first surface 103 includes a first plurality of electrodes 120 and 125 that can receive voltage (or current) signals (or are connected to ground potential) and can generate a pseudopotential that can prevent/inhibit ions from approaching the first surface 103. The first plurality of electrodes 120 and 125 can be rectangular and the longer edge of the rectangle can be arranged along the direction of propagation of ions undergoing mobility separation ("propagation axis"). For example, in FIG. 3, the propagation axis is parallel to the z-axis. The first plurality of electrodes can be separated from each other along a lateral direction (e.g., along the y-axis). For example, the lateral direction can be perpendicular to the propagation axis (e.g. the z axis).

The first surface 103 can include a second plurality of electrodes 130 that can be located between the electrodes of the first plurality of electrodes (e.g., in the space between the first plurality of electrodes 120 and 125). The second plurality of electrodes 130 can include multiple electrodes that are segmented/arranged along (or parallel to) the propagation axis. The second plurality of electrodes 130 can receive a second voltage signal and generate a drive potential that can drive ions along the propagation axis. The drive potential can lead to separation of ions based on their mobility as they move along the propagation axis.

The first surface can include guard electrodes 110 that are positioned adjacent to the outer most of the first/second plurality of electrodes. For example, the guard electrodes 110 can be located at the edges of the first surface 103 along the lateral direction. The guard electrodes 110 can receive a voltage signal (e.g., DC voltage signal from a DC control circuit) and generate a guard potential that can confine ions in the ion channels between the guard electrodes along the lateral direction.

The first plurality of electrodes, the second plurality of electrodes, and the guard electrodes can be connected to one or more voltage control circuits (e.g., voltage control circuits in the controller 150). In some implementations, the first plurality of electrodes 120 and 125 can receive radio frequency (RF) signals that are phase shifted with respect to each other. In some implementations, the master control circuit can control the operation of two RF control circuits to generate two RF voltage signals that are phase shifted from one another.

Figure 4:
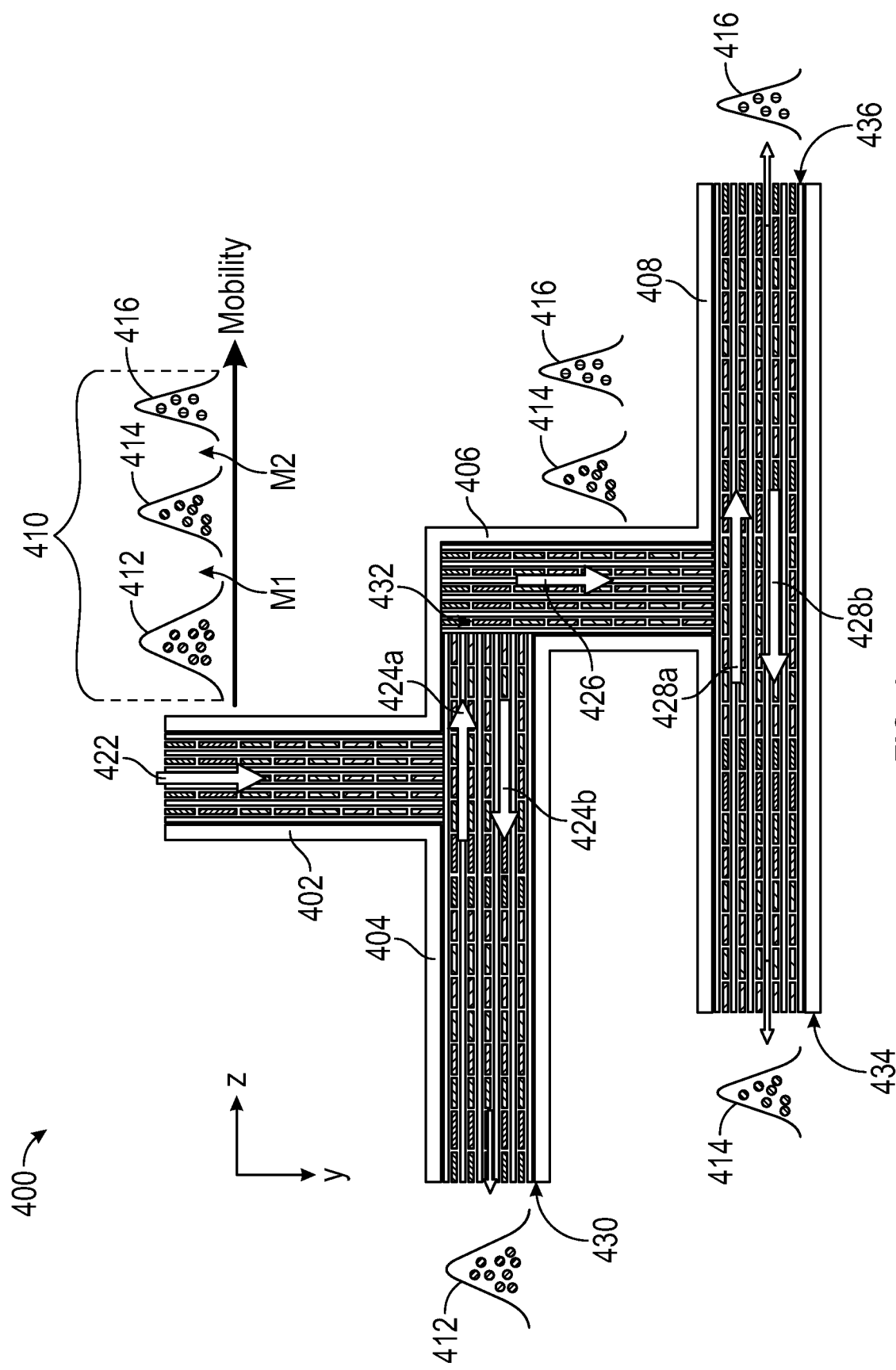
FIG. 4 illustrated an exemplary SLIM filter.

FIG. 4 illustrated an exemplary SLIM filter 400. The SLIM filter 400 can be configured to operate in a band pass filtering mode and select (or isolate) ions having mobility between a first threshold mobility M1 and a second threshold mobility M2. The SLIM filter 400 includes an input SLIM 402 that can receive ion packet 410 from the ionization source (e.g., ionization source 102) and direct the received ions 410 to the first separation region 404. The received ion packet 410 can be generated by an ionization source (e.g. ionization source 102). The ion packet 410 can include ion sub-packets 412, 414 and 416 that include ions of various mobility. For example, ion sub-packet 414 can include ions with mobility ranging between M1 an M2.

The input SLIM 402 can generate a traveling potential waveform 422 (e.g., based on receipt of a traveling wave voltage signal from the controller 108) that can drive the ion packet 410 to the first separation region 404. The first separation region 404 can extend between a first end 430 and a second end 432. The first separation region 404 can generate a first potential waveform 424a and a second potential waveform 424b. The potential waveforms 424a and 424b can be traveling in opposite directions (e.g., along +z and −z directions respectively). In some implementations, one of the potential waveforms 424a and 424b can be a traveling potential waveform and the other can be a DC potential waveform. The DC potential waveform can be decreasing from one end of the first separation 404 to another. The direction in which the DC waveform decreases can be opposite to the direction of travel of the traveling potential waveform. For example, if potential waveform 424a is a traveling potential waveform traveling along +z axis, potential waveform 424b can be a DC potential waveform (or a gradient) whose amplitude decreases along the −z axis.

Potential waveforms 424*a* and 424*b* can each apply a force on the ions in the ion packet 410 (e.g., in the opposite directions). Based on the mobility of a given ion in the ion packet 410 and properties of the potential waveforms 424*a* and 424*b* (e.g., amplitude, shape, velocity, gradient, etc.) the given ion can travel along a given direction (e.g., +z or −z direction). For example, the properties of the potential waveforms 424*a* and 424*b* can be set such that ions in the ion packet 410 with mobility greater than M1 (e.g., ion sub-packets 414 and 416) travel along the +z direction and ions with mobility less than M1 (e.g. ion sub-packets 412) travels along the −z direction. The ion sub-packet 412 can be ejected out of the separation region 404 where it can be detected by a detector (e.g., spectrometer, ion counter, etc.) located at the first end 430.

The transfer SLIM 406 can receive the ion sub-packets 414 and 416. The transfer SLIM 406 can generate a traveling potential waveform 426 (e.g., based on receipt of a traveling wave voltage signal from the controller 108) that can drive the ion sub-packets 414 and 416 to the second separation region 408. The second separation region 408 can extend between a third end 434 and fourth end 436, and can generate a third potential waveform 428*a* and a fourth potential waveform 428*b*. The potential waveforms 428*a* and 428*b* can be traveling in opposite directions (e.g., along +z and −z directions respectively). In some implementations, one of the potential waveforms 428*a* and 428*b* can be a traveling potential waveform and the other can be a DC potential waveform. As described above, the DC potential waveform can decrease from one end of the second separation 408 to another. The direction in which the amplitude of the DC waveform decreases can be opposite to the direction of travel of the traveling potential waveform. For example, if potential waveform 428*a* is a traveling potential waveform traveling along +z axis, potential waveform 428*b* can be a DC potential waveform that decreases along the −z axis (or vice versa).

Based on the mobility of a given ion in the ion sub-packets 414 and 416, and properties of the potential waveforms 428*a* and 428*b* (e.g., amplitude, shape, velocity, gradient, etc.) the given ion can travel along a given direction (e.g., +z or −z direction). For example, ions with mobility greater than M2 (e.g., ion sub-packet 416) travel along the +z direction and ions with mobility less than M2 (e.g. ion sub-packets 414) travels along the −z direction. The ion sub-packets 414 and 416 can be ejected out of opposite ends of the separation region 408 (e.g., third end 434 and 436, respectively) where they can be detected by detectors (e.g., spectrometers, ion counter, etc.)

As described above, the SLIM filter 400 can selectively isolate the ion sub-packet 414 (having mobility between the first threshold mobility M1 and the second threshold mobility M2) that can be ejected out from the third end 434 of the second separation region 408. As a result, the SLIM filter 400 behaves like a band pass filter. Additionally, the SLIM filter 400 can behave as a low pass filter by isolating ions having mobility less than M1 (ion sub-packet 412) and ejecting them from the first end 430 of the first separation region 404. Furthermore, the SLIM filter 400 can behave as a high pass filter by isolating ions having mobility above M2 (ion sub-packet 416) and ejecting them from the fourth end 436 of the second separation region 408.

As described above (e.g., in FIG. 2), the SLIM filter 400 can include two surfaces that define one or more channels. The two surfaces can include electrodes (e.g., electrodes 110, 120, 125) that can receive voltage signals from the traveling wave/DC control circuits and generate the potential waveforms 422, 424*a*, 424*b*, 426, 428*a* and 428*b*. The master control circuit can control the operation of the traveling wave/DC control circuits and can determine the properties (e.g., speed, amplitude, shape, gradient, etc.) of the potential waveforms 422, 424*a*, 424*b*, 426, 428*a* and 428*b*.

Figure 5:
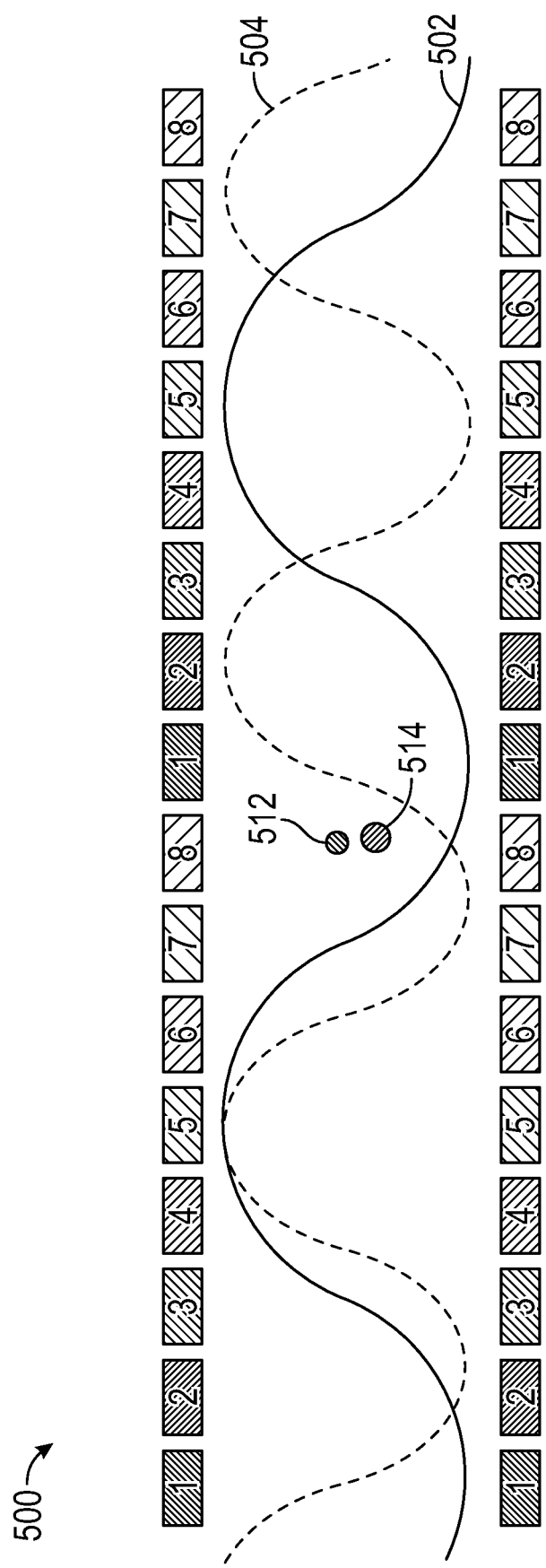
FIG. 5 illustrates exemplary potential waveforms generated in a separation region of the SLIM filter in FIG. 4.

FIG. 5 illustrates an exemplary cross-section 500 of a separation region of a SLIM filter (e.g., SLIM filter 400). The cross-section 500 includes electrodes 1-8 arranged on two planes that define an ion channel. The electrodes 1-8 can generate (e.g., simultaneously) two traveling potential waveforms 502 and 504. The traveling potential waveforms 502 and 504 can travel in opposite direction and each can apply a force on ions 512 and 514. Depending on the mobility of the ions 512 and 514, both the ions 512 and 514 can travel to the left, travel to the right, one of the ions 512 travel to the left and 514 travel to the right (or vice versa). A person skilled in the art would readily appreciate that potential waveforms 502 and 504 represent AC traveling waveforms, however, one or both of the potential waveforms can be DC traveling waveforms without departing from the scope of the present invention.

Figure 6:
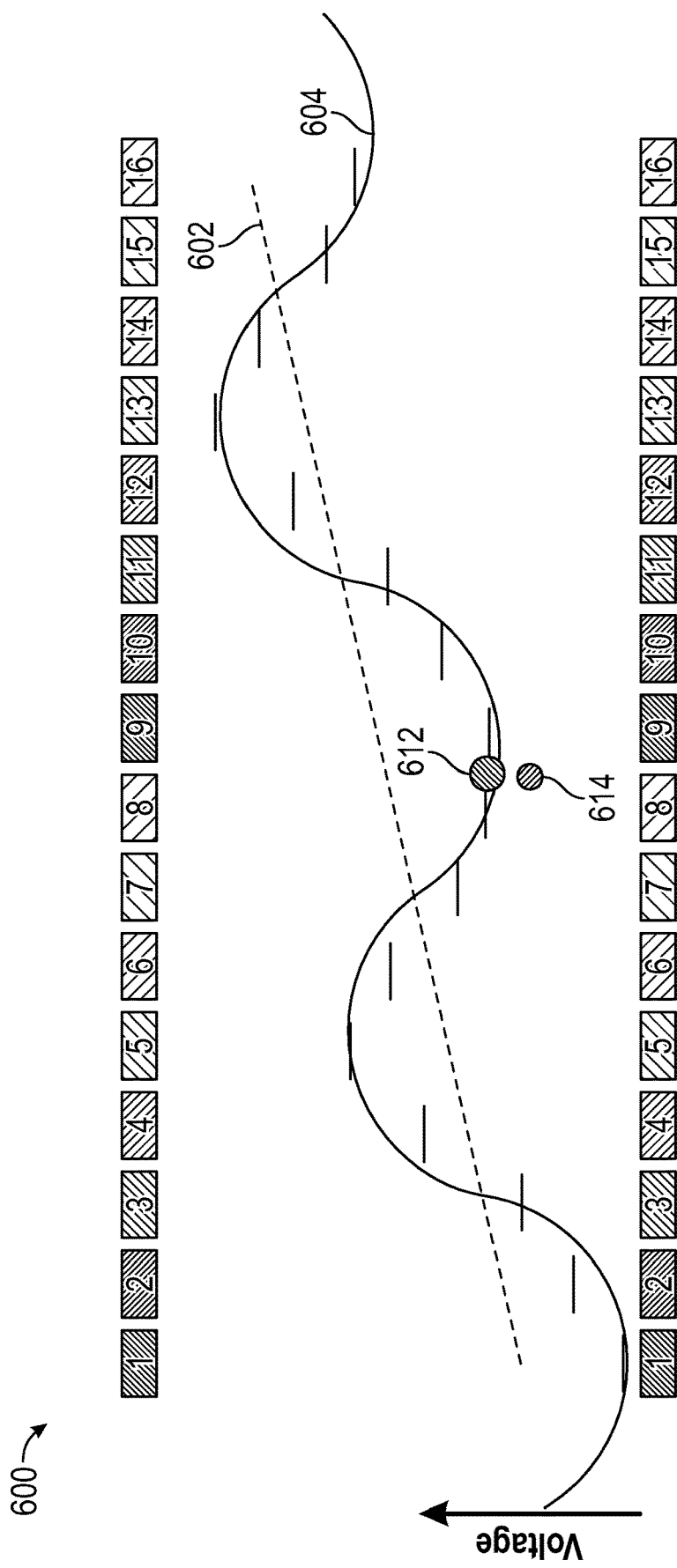
FIG. 6 illustrates exemplary potential waveforms generated in a separation region of the SLIM filter in FIG. 4.

FIG. 6 illustrates an exemplary cross-section 600 of a separation region of a SLIM filter (e.g., SLIM filter 400). The cross-section 600 includes electrodes 1-8 arranged on two planes that define an ion channel. The electrodes 1-8 can generate (e.g., simultaneously) a traveling potential waveform (not shown) and a DC potential waveform 602. FIG. 6 also illustrates the superimposed potential waveform 604 (e.g., superposition of traveling potential waveform and the DC potential waveform 602). The superposition potential waveform can drive both the ions 612 and 614 to the left or right, one of the ions 612 and 614 to the left and the other to the right (or vice versa), etc. A person skilled in the art would readily appreciate that traveling waveform used to create the superposition potential waveform is a AC traveling wave, however, a DC traveling waveform can be utilized without departing from the scope of the present invention.

Properties of the potential waveforms 424*a*, 424*b*, 428*a* and 428*b* can be varied to achieve desirable separation of ions in the ion packet 410. This can be done for example, by the master control circuit and/or by an operator. In one implementation, ion detectors (e.g., ion counters, mass spectrometer) can be located at one or more of the first end 430, second end 434, and third end 436. The ion detectors can detect the ion count and/or mass-to-charge ratio of the exiting ions (e.g., ion sub-packets 412, 414, 416, etc.) and transmit the information to the master control circuit. Based on this information the master control circuit can vary the properties of one or more of the potential waveforms 424*a*, 424*b*, 428*a* and 428*b*.

Figure 7:
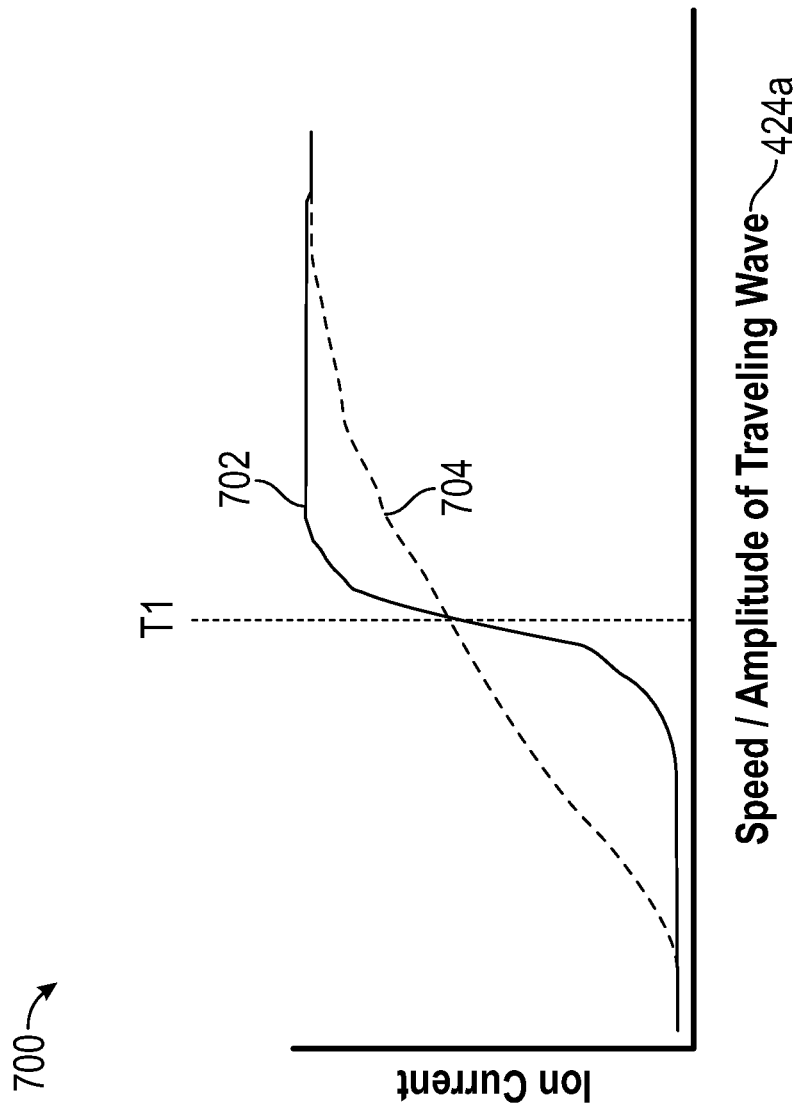
FIG. 7 illustrates an exemplary ion current detection at a first end of a separation region of the SLIM filter in FIG. 4.

FIG. 7 illustrates an exemplary ion current detection at the first end 430 of the separation region 404. The ion current can be varied by changing the speed and/or amplitude of the first potential waveform 424*a* and a second potential waveform 424*b*. Ion current curve 702 can be obtained by holding the speed and/or amplitude of the potential waveform 424*b* fixed at a first value (or values), and varying the speed and/or amplitude of the potential waveform 424*a*. Similarly, ion current curve 704 can be obtained by holding the speed and/or amplitude of the potential waveform 424*b* fixed at a second value (or values), and varying the speed and/or amplitude of the potential waveform 424*a*. The ion current curve 704 varies gradually as a function of speed and/or amplitude of the potential waveform 424*a*. The ion current 702, can vary rapidly around a transition value (or values) Ti associated with the speed and/or amplitude of the traveling wave 424a.

In some implementations, ion separation associated with the curve 702 can be desirable. Such ion separation can improve the performance of the ion filtering in separation region 404 (e.g., can provide for a sharp cut-off mobility of the ion separation in the ion separation region 404). For example, it can be desirable that a sharp cut-off mobility is achieved at the first threshold mobility M1. In other words, ions with mobility higher than M1 are prevented (or suppressed) from heading towards the first end 430 and ions with mobility lower than M1 are prevented (or suppressed) from heading towards the second end 432. This can be achieved by varying the speed and/or amplitude of the potential waveform 424a for a fixed potential waveform 424.

In some implementations, the ion detector at the first end 430 can be a mass spectrometer that can detect both the ion count and the mobility of the ions ejected at the first end 430 (e.g., ion sub-packet 412). Based on this information, the properties of the potential waveforms 424a and 424b can be set to the value of the first threshold mobility M1. As discussed above, the properties of the potential waveforms 428a and 428b can be varied to achieve desirable separation in the second separation SLIM 408. For example, the properties of the potential waveforms 428a and 428b can be varied until a sharp cut-off mobility is achieved at the second threshold mobility M2. For example, ions with mobility higher than M2 are prevented (or suppressed) from heading towards the third end 434 and ions with mobility lower than M1 are prevented (or suppressed) from heading towards the fourth end 436. A detector placed at the third end 434 can detect ions (e.g., ion sub-packet 414) with mobility below the second threshold mobility M2 and above the first threshold mobility M1 ("band pass filtering"). A detector placed at the fourth end 436 can detect ions (e.g., ion sub-packet 416) with mobility above the second threshold mobility M2.

The master control circuit can vary the properties of the potential waveforms 426a, 426b, 428a and 428b in order to achieve predetermined parameters of the band pass filter (e.g. threshold mobility values M1 and M2, drop-off at the threshold mobility values, etc.). In some implementations, the shape of the potential waveforms 426a, 426b, 428a and 428b can be predetermined to improve (e.g., optimize) the mobility based separation of ions.

Figure 8:
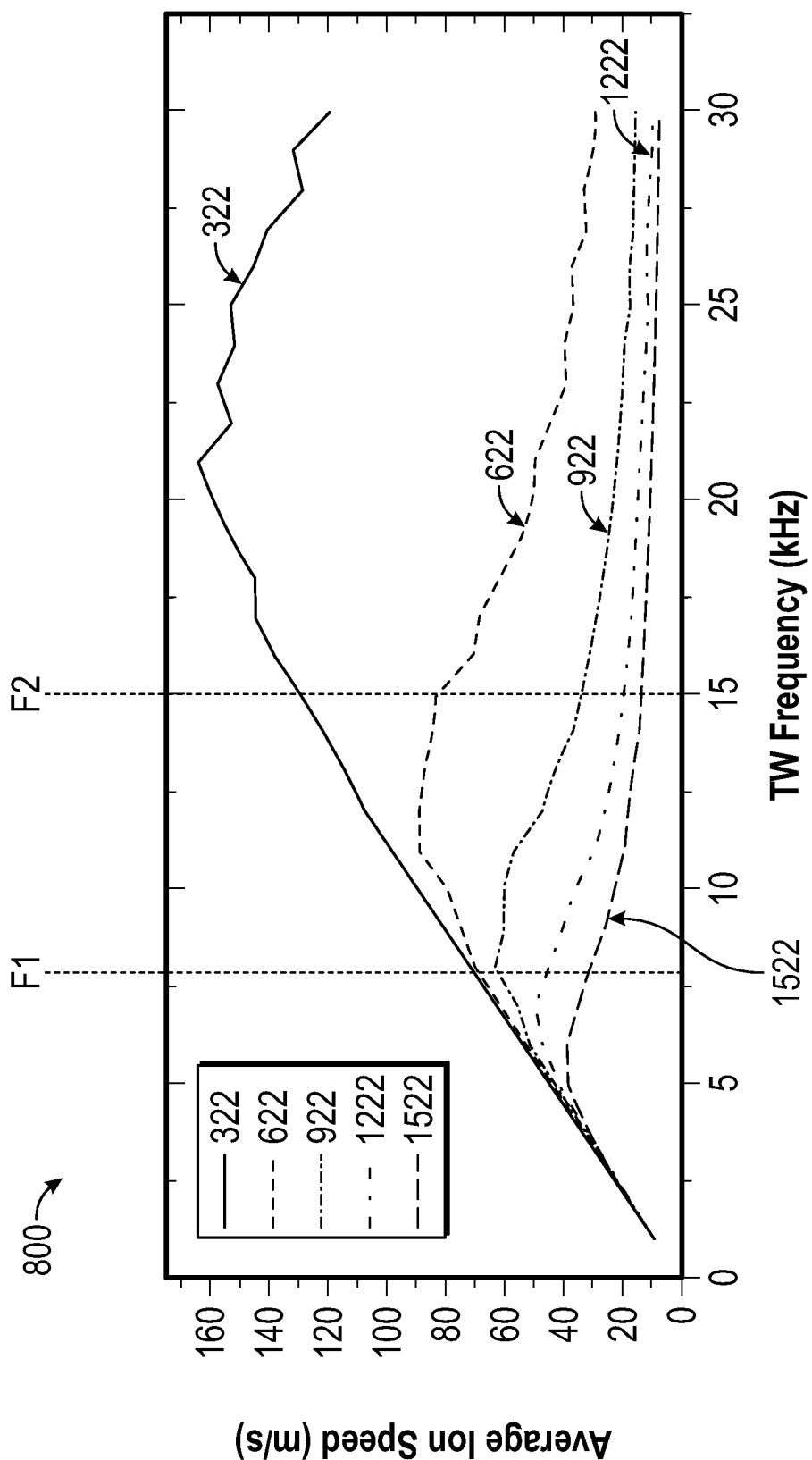
FIG. 8 is a plot of average speeds of ions as a function of frequency of a traveling wave driving the ions.

FIG. 8 is a plot of average speeds of ions under the influence of traveling potential waveform of various frequencies (which is indicative of the speed of the traveling potential waveforms). As the frequency of the traveling waveform increases from F1 to F2, the average ion speed of ion 322 increases. However, the average ion speed of ion 922 decreases as the frequency waveform increases from F1 to F2. If ion 322 is placed in the first separation region 404, and the potential waveforms 424a and 424b have frequencies F1 and F2, respectively, ion 322 will be driven in the direction of potential waveform 424b. However, if ion 922 is placed in the first separation region 404, and the potential waveforms 424a and 424b have frequencies F1 and F2, respectively, ion 922 will be driven in the direction of potential waveform 424a. Therefore, if both the ions 322 and 922 are placed in the first separation region 404, ion 322 will be driven in the direction of potential waveform 424b, and the ion 922 will be driven in the direction of potential waveform 424a. As a result, the two ions can be separated.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A system comprising:
   a first ion channel extending between a first end and a second end, and configured to receive an ion packet, the first ion channel being defined between a first surface and a second surface adjacent to the first surface;
   a controller configured to apply a first voltage signal and a second voltage signal to a first plurality of electrodes adjacent to the first ion channel,
      wherein the first plurality of electrodes are configured to generate, based on receipt of the first voltage signal, a first traveling drive potential that travels at a first speed along a first direction, the first direction extending from the first end to the second end, and
      wherein the first plurality of electrodes are configured to generate, based on receipt of the second voltage signal, a second DC potential decreasing along a second direction, the second direction extending from the second end to the first end,
      wherein a first ion sub-packet of the ion packet having ions with mobilities above a first threshold mobility value is directed along one of the first and the second direction, and a second ion sub-packet of the ion packet having ions with mobilities below the first threshold mobility value is directed along the other of the first and the second direction; and
   wherein the second surface includes a second plurality of electrodes comprising a first electrode and a second electrode spaced apart from the first electrode along a third direction lateral to the first direction, wherein the first plurality of electrodes are located between the first electrode and the second electrode and arranged along the first direction.

2. The system of claim 1, wherein the first and second electrodes in the second plurality of electrodes are configured to generate RF signals that are phase shifted.

3. The system of claim 2, wherein the controller includes:
   one or more traveling wave control circuits electrically coupled to the first plurality of electrodes, the one or more traveling wave control circuits configured to generate a first plurality of traveling wave voltage signals, the first voltage signal includes the first plurality of traveling wave voltage signals; and
   one or more DC control circuits electrically coupled to the first plurality of electrodes, the one or more DC control circuits configured to generate a second plurality of DC voltage signals, the second voltage signal includes the second plurality of DC voltage signals.

4. The system of claim 3, wherein the controller includes a master control circuit communicatively coupled to the one or more traveling wave control circuits and the one or more DC control circuits, the master control circuit configured to:
   determine one or more of amplitudes and/or frequencies of the first plurality of traveling wave voltage signals and the second plurality of DC voltage signals; and
   provide traveling wave control signals and DC control signals to the one or more traveling wave control circuits and the one or more DC control circuits, wherein the traveling wave control signal and the DC control signals are indicative of one or more of the amplitudes and/or frequencies of the first plurality of traveling wave voltage signals and second plurality of DC voltage signals, respectively.

5. The system of claim 4, wherein the master control circuit is further configured to determine the first speed of the first traveling drive potential, and a gradient of the second DC potential.

6. The system of claim 5, further comprising:
a second ion channel extending between a third end and a fourth end, and configured to receive the first ion sub-packet,
   wherein the controller is configured to apply a third voltage signal and a fourth voltage signal to a third plurality of electrodes adjacent to the second ion channel,
   wherein the third plurality of electrodes are configured to generate, based on receipt of the third voltage signal, a second traveling drive potential that travels at a second speed along a third direction, the third direction extending from the third end to the fourth end, and
   wherein the third plurality of electrodes are configured to generate, based on receipt of the fourth voltage signal, a third traveling drive potential that travels at a third speed along a fourth direction, the fourth direction extending from the fourth end to the third end, and
   wherein a third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

7. The system of claim 5, further comprising:
a second ion channel extending between a third end and a fourth end, and configured to receive the first ion sub-packet,
   wherein the controller is configured to apply a third voltage signal and a fourth voltage signal to a third plurality of electrodes adjacent to the second ion channel,
   wherein the third plurality of electrodes are configured to generate, based on receipt of the third voltage signal, a second traveling drive potential that travels at a second speed along a third direction, the third direction extending from the third end to the fourth end, and
   wherein the third plurality of electrodes are configured to generate, based on receipt of the fourth voltage signal, a second DC potential decreasing along a fourth direction, the fourth direction extending from the fourth end to the third end, and
   wherein a third ion sub-packet of the first ion sub-packet having ions with mobilities above a second threshold mobility value is directed along one of the third and the fourth direction, and a fourth ion sub-packet of the first ion sub-packet having ions with mobilities below the second threshold mobility value is directed along the other of the third and the fourth direction.

8. A method comprising:
providing a first ion channel extending between a first end and a second end, and configured to receive an ion packet, the first ion channel is defined between a first surface and a second surface adjacent to the first surface;
applying a first voltage signal and a second voltage signal to a first plurality of electrodes adjacent to the first ion channel, generating, by the first plurality of electrodes, a first traveling drive potential that travels at a first speed along a first direction, the first direction extending from the first end to the second end, the generating of the first traveling drive potential based on receipt of the first voltage signal;
generating, by the first plurality of electrodes, a second DC potential decreasing along a second direction, the second direction extending from the second end to the first end, the generating of the second DC potential based on receipt of the second voltage signal,
   wherein a first ion sub-packet of the ion packet having ions with mobilities above a first threshold mobility value is directed along one of the first and the second direction, and a second ion sub-packet of the ion packet having ions with mobilities below the first threshold mobility value is directed along the other of the first and the second direction; and
wherein the second surface includes a second plurality of electrodes that includes a first electrode and a second electrode spaced apart from the first electrode along a third direction lateral to the first direction, wherein the first plurality of electrodes are located between the first electrode and the second electrode and arranged along the first direction.

9. The method of claim 8, wherein the first and second electrodes in the second plurality of electrodes are configured to generate RF signals that are phase shifted.

10. The method of claim 9, further comprising:
generating, by one or more traveling wave control circuits electrically coupled to the first plurality of electrodes, a first plurality of traveling wave voltage signals, wherein the first voltage signal includes the first plurality of traveling wave voltage signals; and
generating, by one or more DC control circuits electrically coupled to the first plurality of electrodes, a second plurality of DC voltage signals, wherein the second voltage signal includes the second plurality of DC voltage signals.

11. The method of claim 10, further comprising:
determining, by a master control circuit communicatively coupled to the one or more traveling wave control circuits and the one or more DC control circuits, one or more of amplitudes and/or frequencies of the first plurality of traveling wave voltage signals and the second plurality of DC voltage signals; and
providing, by the master control circuit, traveling wave control signals and DC control signals to the one or more traveling wave control circuits and the one or more DC control circuits, wherein the traveling wave control signal and the DC control signals are indicative of one or more of the amplitudes and/or frequencies of the first plurality of traveling wave voltage signals and second plurality of DC voltage signals, respectively.

12. The method of claim 11, wherein the master control circuit is further configured to determine the first speed of the first traveling drive potential, and a gradient of the second DC potential.

13. The method of claim 12, further comprising:
providing, a second ion channel extending between a third end and a fourth end, and configured to receive the first ion sub-packet,
applying, a third voltage signal and a fourth voltage signal to a third plurality of electrodes adjacent to the second ion channel,
generating, by the third plurality of electrodes, a second traveling drive potential that travels at a second speed along a third direction, the third direction extending from the third end to the fourth end, the generating of the second traveling drive potential based on receipt of the third voltage signal; and generating, by the third plurality of electrodes, a third traveling drive potential that travels at a third speed along a fourth direction, the fourth direction extending from the fourth end to the third end, the generating of the third traveling drive potential based on receipt of the fourth voltage signal, wherein a third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

14. The method of claim 12, further comprising:

providing, a second ion channel extending between a third end and a fourth end, and configured to receive the first ion sub-packet, applying, a third voltage signal and a fourth voltage signal to a third plurality of electrodes adjacent to the second ion channel, generating, by the third plurality of electrodes, a second traveling drive potential that travels at a second speed along a third direction, the third direction extending from the third end to the fourth end, the generating of the second traveling drive potential based on receipt of the third voltage signal; and generating, by the third plurality of electrodes, a second DC potential decreasing along a fourth direction, the fourth direction extending from the fourth end to the third end, the generating of the second DC potential based on receipt of the fourth voltage signal, wherein a third ion sub-packet of the first ion sub-packet having ions with mobilities above a second threshold mobility value is directed along the third direction, and a fourth ion sub-packet of the first ion sub-packet having ions with mobilities below the second threshold mobility value is directed along the fourth direction.

\* \* \* \* \*